United States Patent
Scafaria

(10) Patent No.: US 10,922,702 B2
(45) Date of Patent: Feb. 16, 2021

(54) METHOD, APPARATUS, AND COMPUTER-READABLE MEDIUM FOR IDENTIFYING

(71) Applicant: DotAlign, Inc., New York, NY (US)

(72) Inventor: Vince Scafaria, Colts Neck, NJ (US)

(73) Assignee: DotAlign, Inc., New York, NY (US)

( * ) Notice: Subject to any disclaimer, the term of this patent is extended or adjusted under 35 U.S.C. 154(b) by 276 days.

(21) Appl. No.: 15/499,073

(22) Filed: Apr. 27, 2017

(65) Prior Publication Data

US 2017/0316058 A1 Nov. 2, 2017

Related U.S. Application Data

(60) Provisional application No. 62/329,711, filed on Apr. 29, 2016, provisional application No. 62/331,063, filed on May 3, 2016.

(51) Int. Cl.
| | |
|---|---|
| *G06F 16/20* | (2019.01) |
| *G06Q 30/02* | (2012.01) |
| *G06F 16/215* | (2019.01) |
| *G06Q 10/10* | (2012.01) |

(52) U.S. Cl.
CPC ....... *G06Q 30/0201* (2013.01); *G06F 16/215* (2019.01); *G06Q 10/10* (2013.01)

(58) Field of Classification Search
None
See application file for complete search history.

(56) References Cited

U.S. PATENT DOCUMENTS

| | | |
|---|---|---|
| 7,403,942 B1 | 7/2008 | Bayliss |
| 7,647,344 B2 | 1/2010 | Skurtovich, Jr. et al. |
| 8,041,745 B2 | 10/2011 | Newton et al. |
| 8,255,464 B2 | 8/2012 | Wilkins |
| 8,381,120 B2 | 2/2013 | Stibel et al. |
| 8,943,059 B2 | 1/2015 | Rozenwald et al. |
| 9,116,975 B2 | 8/2015 | Shankar et al. |
| 9,292,585 B2 | 3/2016 | Schleifer et al. |
| 2005/0065980 A1 | 3/2005 | Hyatt et al. |
| 2008/0033936 A1* | 2/2008 | Frank ............... G09B 29/00 |

(Continued)

OTHER PUBLICATIONS

U.S. Patent and Trademark Office (ISA/US), International Search Report and Written Opinion from PCT International Application No. PCT/US2017/029957 as completed Jun. 30, 2017 and dated Jul. 19, 2017 (total 5 pages).

(Continued)

*Primary Examiner* — Belix M Ortiz Ditren
(74) *Attorney, Agent, or Firm* — Timothy W. Menasco, Esq.; Harter Secrest & Emery LLP

(57) ABSTRACT

Exemplary embodiments of the present disclosure provide a method, apparatus, and computer-readable medium for identifying. An exemplary method includes providing a plurality of identifiers from a plurality of data sources, the plurality of identifiers corresponding to a plurality of entities, and creating a plurality of tuples based on the plurality of identifiers, wherein each one of the plurality of tuples corresponds (i) a particular one of the plurality of data sources and (ii) to at least two identifiers that are linked together. The method further includes receiving an identifier, and determining whether the received identifier matches any of the plurality of tuples.

15 Claims, 6 Drawing Sheets

(56) References Cited

U.S. PATENT DOCUMENTS

Figure 1:
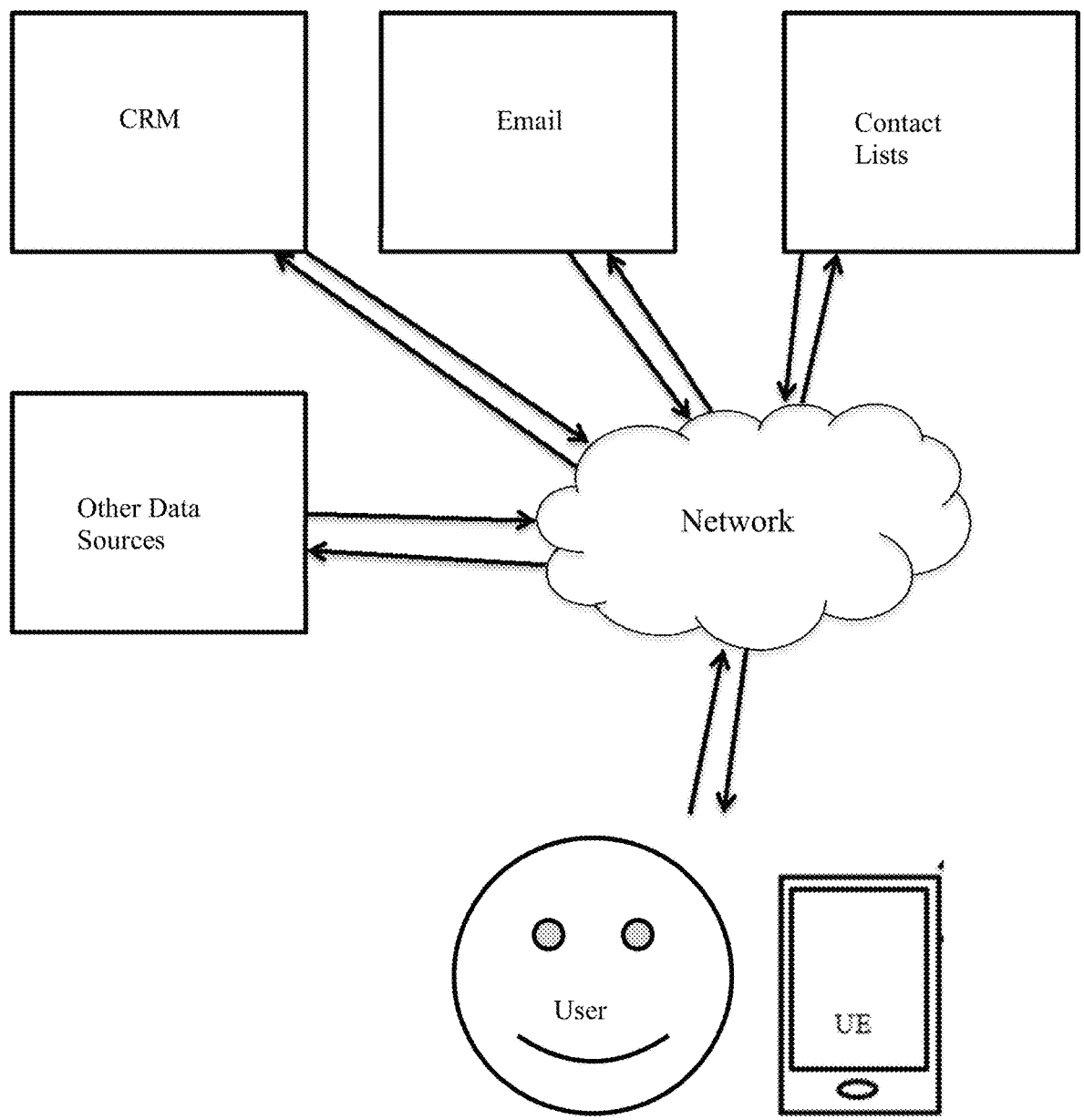

| | | |
|---|---|---|
| 2008/0133580 A1 | 6/2008 | Wanless et al. |
| 2011/0055234 A1 | 3/2011 | Miettinen |
| 2011/0082843 A1* | 4/2011 | Kashiwagi .......... G06F 16/9017 |
| | | 707/693 |
| 2012/0150888 A1 | 6/2012 | Hyatt et al. |
| 2012/0158744 A1 | 6/2012 | Tseng et al. |
| 2012/0197907 A1 | 8/2012 | Malyshev et al. |
| 2013/0117287 A1* | 5/2013 | Jagota .................... G06Q 10/06 |
| | | 707/755 |
| 2014/0330845 A1 | 11/2014 | Feldschuh |
| 2015/0039623 A1 | 2/2015 | Pandit et al. |
| 2015/0074053 A1 | 3/2015 | Sarferaz |

OTHER PUBLICATIONS

Lifang Gu et al., "Record Linkage: Current Practice and Future Directions", CSIRO Mathematical and Information Sciences, CMIS Technical Report found at http://datamining.csiro.au, 2003.

Hongzhi Wang et al., "Cleanix: a Parallel Big Data Cleaning System", SIGMOD Record (vol. 44, No. 4), pp. 35-40, Dec. 2015.

* cited by examiner

402: (a) providing, by a processor, a plurality of identifiers from a plurality of data sources, the plurality of identifiers corresponding to a plurality of entities; (b) creating, by the processor, a plurality of tuples based on the plurality of identifiers, wherein each one of the plurality of tuples corresponds to (i) a particular one of the plurality of data sources and (ii) to at least two identifiers that are linked together; (c) receiving, by the processor, an identifier; and (d) determining, by the processor, whether the received identifier matches any of the plurality of tuples.

404: wherein the plurality of identifiers comprises names, addresses, telephone numbers, email addresses, and usernames

406: wherein the plurality of entities comprises people, companies, and groups

408: wherein the plurality of data sources comprises CRM, email accounts, and contact lists

410: wherein multiple tuples correspond to a same entity

FIG. 4

METHOD, APPARATUS, AND COMPUTER-READABLE MEDIUM FOR IDENTIFYING

BACKGROUND OF THE INVENTION

Field of the Invention

Exemplary embodiments of the present disclosure provide a method, apparatus, and computer-readable medium for identifying. Exemplary embodiments of the present disclosure relate more particularly to a method, apparatus, and computer-readable medium for identifying entities.

Description of Related Art

There are many different types of information that can be associated with a person, company, group, organization, or entity. These different types of information can be used for the purpose of distinguishing one person, company, group, organization, or entity from another. Some of the types of information include name, address, email address, passport number, IP address, vehicle registration plate number, driver's license number, credit card numbers, date of birth, birthplace, telephone number, username, login information, screen name, nickname, and handle.

BRIEF SUMMARY OF THE INVENTION

In view of the foregoing, it is an object of the present disclosure to provide a method, apparatus, and computer-readable medium for identifying.

A first exemplary embodiment of the present disclosure provides a method for identifying. The method includes providing, by a processor, a plurality of identifiers from a plurality of data sources, the plurality of identifiers corresponding to a plurality of entities, and creating, by the processor, a plurality of tuples based on the plurality of identifiers, wherein each one of the plurality of tuples corresponds to (i) a particular one of the plurality of data sources and (ii) to at least two identifiers that are linked together. The method further includes receiving, by the processor, an identifier, and determining, by the processor, whether the received identifier matches any of the plurality of tuples.

A second exemplary embodiment of the present disclosure provides an apparatus for identifying. The apparatus includes at least one processor and a memory storing computer program instructions executable by the at least one processor, wherein the memory with the computer program instructions and the processor are configured to cause the apparatus to at least provide a plurality of identifiers from a plurality of data sources, the plurality of identifiers corresponding to a plurality of entities, and create a plurality of tuples based on the plurality of identifiers, wherein each one of the plurality of tuples corresponds to (i) a particular one of the plurality of data sources and (ii) to at least two identifiers that are linked together. The at least one processor and memory storing computer program instructions are further configured to cause the apparatus to receive an identifier, and determine whether the received identifier matches any of the plurality of tuples.

A third exemplary embodiment of the present disclosure provides a non-transitory computer-readable medium tangibly storing computer program instructions which when executed by a processor, cause the processor to at least provide a plurality of identifiers from a plurality of data sources, the plurality of identifiers corresponding to a plurality of entities, and create a plurality of tuples based on the plurality of identifiers, wherein each one of the plurality of tuples corresponds to (i) a particular one of the plurality of data sources and (ii) to at least two identifiers that are linked together. The computer-readable medium tangibly storing computer program instructions with the processor further cause the processor to receive an identifier, and determine whether the received identifier matches any of the plurality of tuples.

A fourth exemplary embodiment of the present disclosure provides a method. The method includes receiving, by a processor, an identifier, and determining whether the received identifier matches any of a plurality of tuples, wherein each one of the plurality of tuples corresponds to (i) one of a plurality of data sources and (ii) at least two identifiers that are linked together. The method further includes displaying, by the processor, the determined plurality of tuples that matches the received identifier.

The following will describe embodiments of the present disclosure, but it should be appreciated that the present disclosure is not limited to the described embodiments and various modifications of the invention are possible without departing from the basic principles. The scope of the present disclosure is therefore to be determined solely by the appended claims.

BRIEF DESCRIPTION OF THE SEVERAL VIEWS OF THE DRAWING(S)

FIG. 1 presents a simplified signaling diagram between systems suitable for use in practicing exemplary embodiments of the present disclosure.

Figure 2:
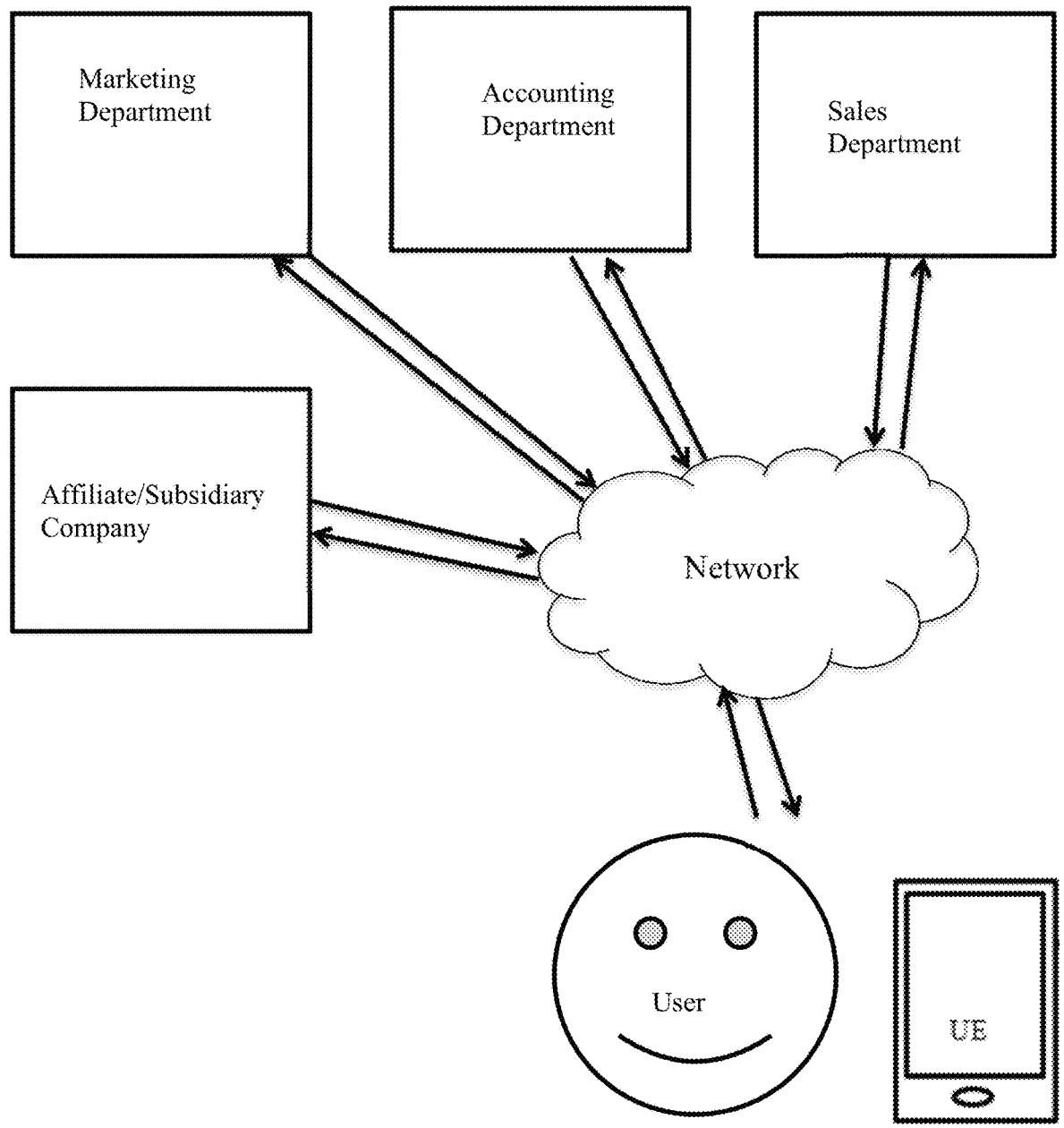

FIG. 2 presents another simplified signaling diagram between systems suitable for use in practicing exemplary embodiments of the present disclosure.

Figure 3:
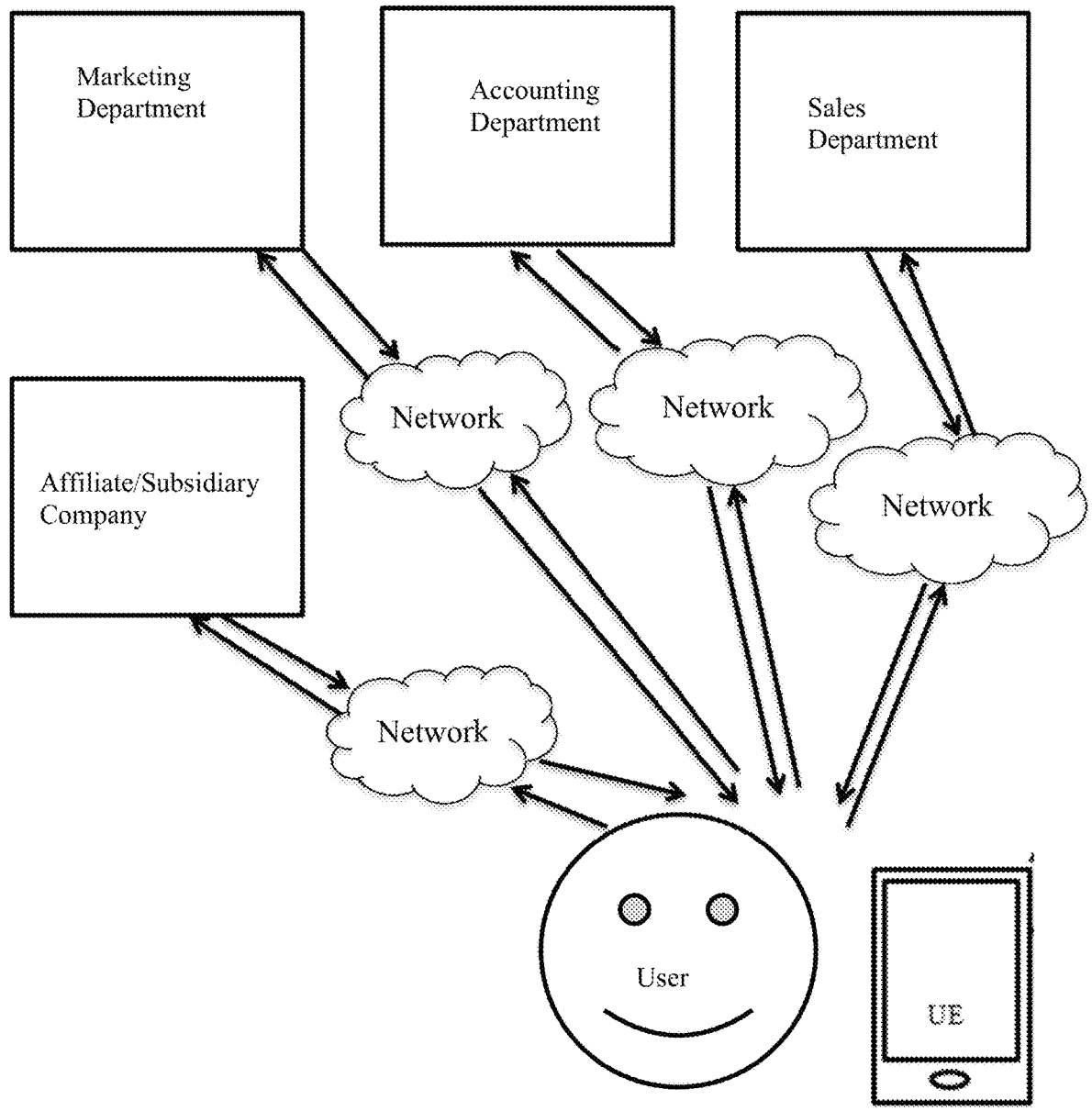

FIG. 3 present yet another simplified signaling diagram between systems suitable for use in practicing exemplary embodiments of the present disclosure.

FIG. 4 presents a logic flow diagram in accordance with a method, apparatus, and computer-readable medium for performing exemplary embodiments of this disclosure.

Figure 5:
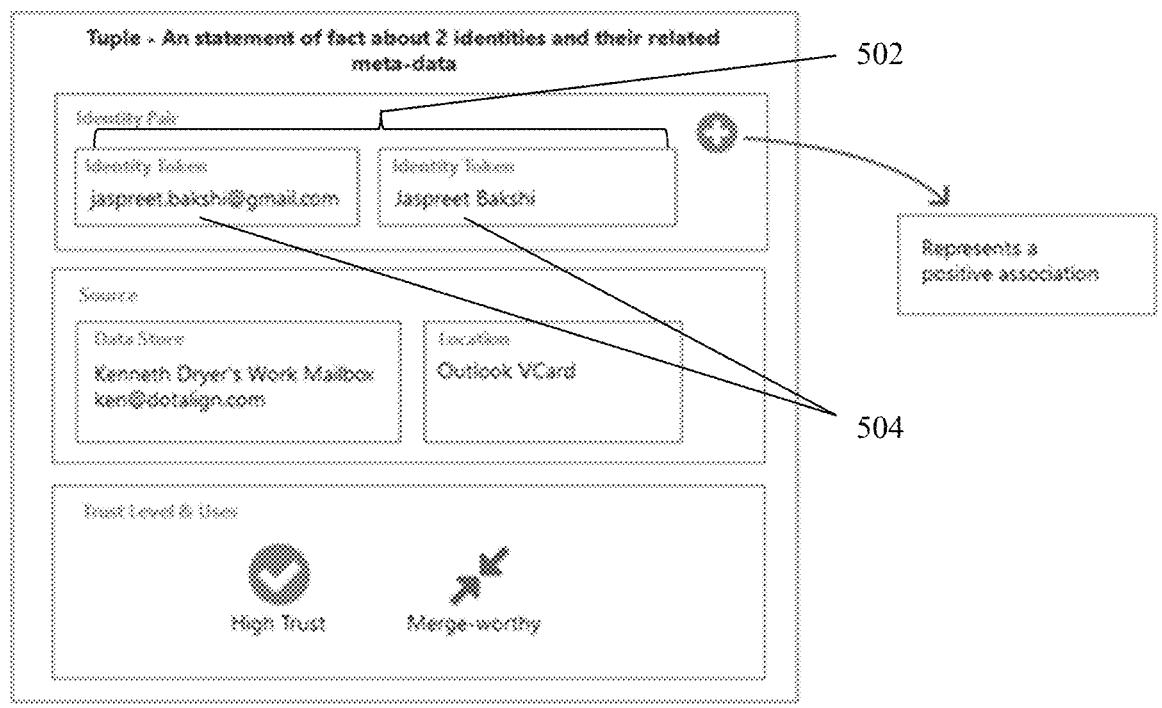

FIG. 5 presents an exemplary tuple in accordance with practicing exemplary embodiments of the present disclosure.

Figure 6:
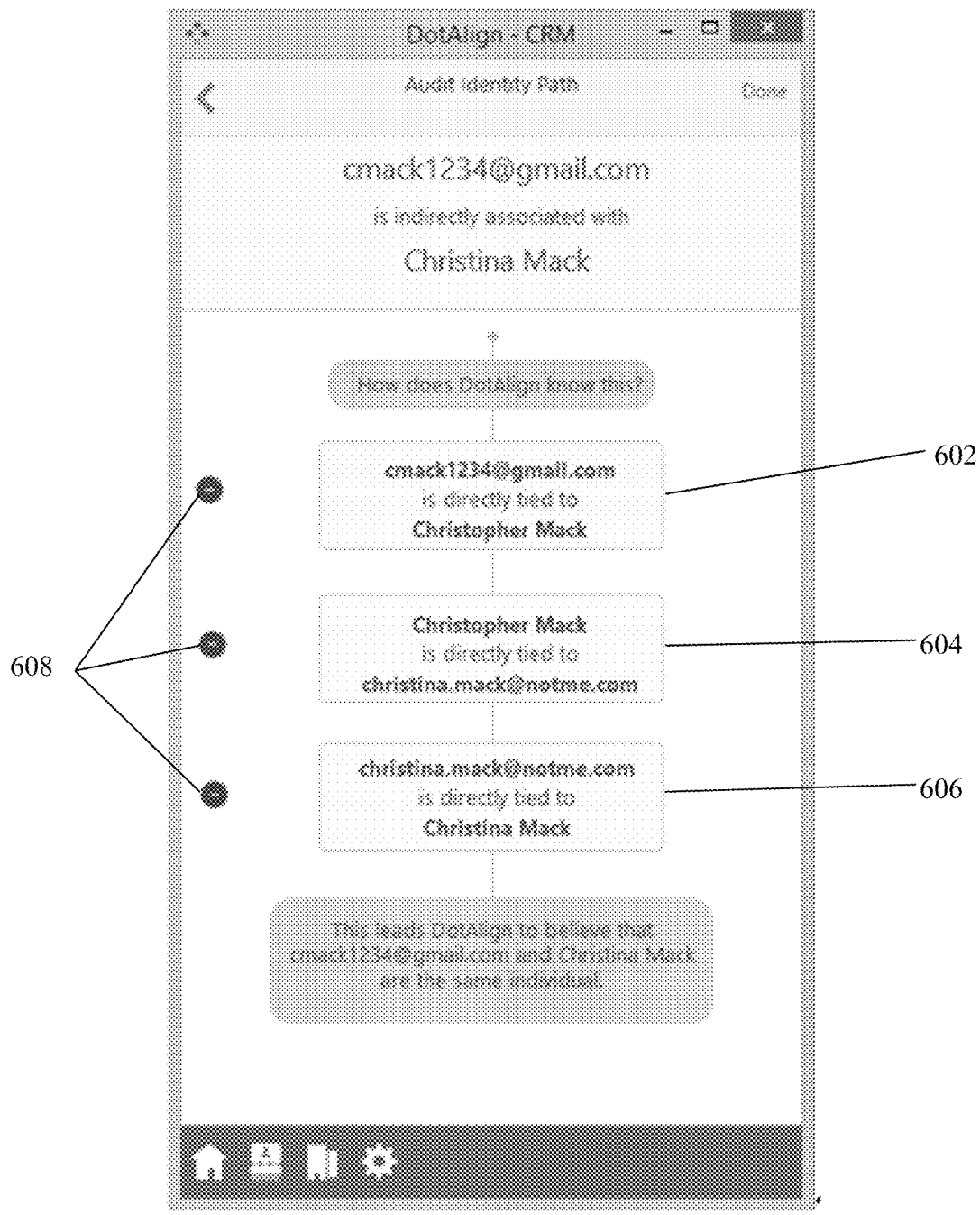

FIG. 6 presents exemplary multiple tuples in accordance with practicing exemplary embodiments of the present disclosure.

DETAILED DESCRIPTION OF THE INVENTION

Companies and relationship professionals need to understand their customers and prospects. Customer relationship management (CRM) software tracks information related to people, companies, the relationships between them, and additional information about those relationships. For example, the relationship between Person A and Company B might be such that Person A is an adviser to the Company B. Also, Person A may have a qualitatively strong relationship with Company B because Person A has had five in-person meetings with Company B within the past month. Complexity and the data and metadata tracking requirements can increase further from there.

Relational database systems and other technologies are designed for tracking relationships between entities. However, they face a fundamental challenge in this domain: Data on people and companies are not generally encountered in the real world with social security numbers or other globally unique natural entity identifiers attached. For example, a piece of information about the relationship between Person A and Company B cannot be stored and used without first making concrete (determining an identifier for) the concept of human being "Person A". One approach is to assign entity identifiers within a single central database to which all others within a company or entity must subscribe or have access. However, this places an undue constraint on each department of the entity. They essentially lose the ability to work with people and company data until formally entered into the single central database and assigned an identifier. Therefore, an entire chain of customer intelligence and relationship intelligence software becomes constrained by the requirement of manual entity management and central identifier assignment. Furthermore, when new systems are introduced, they must also formally subscribe to the central database for identifier assignment (including on a retroactive basis), a process that typically involves time-consuming and expensive manual data integration.

When new information arises about the identity of the person or company, particularly information that would result in merging or splitting entities, further problems result. Suppose, for example, that the relationship between Person #124 and Company #288 is described as "strong" with a score of 90 out of 100 (e.g., metadata about the relationship). Now suppose that new information is encountered by one of the subscribers of the system, and that information suggests that Person #124 is the same human being as Person #174. For example, this subscriber may have knowledge that the person uses two separate email addresses, one of which is currently associated with Person #124 and one with Person #174. Incidentally, Person #174 has a score of 70 with Company #288. This subscriber would naturally want to see combined information, including phone numbers, revised relationship scores vis-a-vis Company #288, etc., for this same human being. However, any such satisfaction would have to wait for the central system (and its other subscribers) to repoint all the data associated with Person #174 to now be for Person #124. At the very least, this process will take time. At worst, the subscriber might not be in a position to share information about the person with the global entity system, making it impossible. For example, it could have been information automatically obtained from the signature block of an email received from the person, listing both addresses in the signature block, and where the subscriber is not in the habit of allowing information from such private correspondence to leak into the master database. After all, automated extraction of information out of sensitive correspondence that is then shared with other subscribers could be disallowed, for example if those other subscribers are in legally distinct divisions of the company. Or suppose all data related to Person #174 actually is repointed to instead reference Person #124. And further suppose that yet another subscriber has information suggesting that these actually are distinct human beings regardless of the first subscriber's observation about email addresses. The system and its subscribers now face the daunting challenge of re-splitting the data.

Embodiments of the present disclosure do away with the requirement of a single central database that has the role of assigning global identifiers for people and companies to which systems must subscribe or have access to in order to share data on people, companies, relationships, and metadata of relationships. Embodiments of the present disclosure instead rely on tuples of entity identifiers that are identified within the scope of a given data store or data source.

A data store or data source can be an email mailbox, a CRM, a source of market data, or other "owned" repository of person, company, relationship, and relationship metadata information. Examples of entity identifiers include, in the case of human beings, identifiers assigned by a CRM, email addresses, names and "formalized names" (i.e. after adjusting "Bill" to "William"), and hashes thereof (e.g. using MD5 or SHA2 hashing algorithms). A tuple is a linking or pairing between two of more entity identifiers (e.g. John Smith with john.smith@email.com) that are identified within the scope of a data store, and which can have an associated degree of confidence, source type (e.g. auto-extraction vs. manual assignment), date of identification, and polarity (e.g., a negative polarity would be a way of opining that this tuple is not true, so as to override a tuple saying that it was true). Shown in FIG. 5 is an exemplary tuple 502, which in this instance includes two identifiers 504 (1) an email address with (2) an individual's name. Also indicated in FIG. 5 along with the tuple 502 is the source of the information, which in this case is within a user's outlook mailbox. A high trust level has been applied to this tuple due to source of the identifiers 504. Tuples obtained by each data store can be optionally shared with other subscribers. Each subscriber analyzes the set of tuples so as to decide how to represent the full set of known human beings and companies in a way that avoids unnecessary duplicates. For example, if bill.sparke@email.com is known to be William Sparke per data store #1, and if William Sparke is also known to be customer #124 per data store #2, then a user subscribing to information from both data stores should see a composite picture of the email, the name, and the customer-related information. The system can also involve a threshold level of tuple certainty below which the entity is not shown as a single person (or company), or where the data can be flagged for manual review. The user can access this information by providing any one of the available pieces of identity information. Nowhere in the system is the requirement of a centrally assigned identifier for this human being.

It should be appreciated that each subscriber may arrive at a different view of human beings, companies, relationships, and relationship metadata depending on what data was made available at that subscriber's level. Furthermore, the "locally computed" identifier for a human or a company is not relevant beyond the scope of that one subscriber (after all, other subscribers may not be entitled to the same constituent data store tuples). The key instead is that the subscriber can utilize any one entity identifier to access other relevant information and identifiers of the entity to which this subscriber has access.

It is considered a best practice that each data store have a specific ownership and provenance and that its records should never represent a commingling of information from other data stores. For example, manual edits made by user John Smith should be maintained in a separate data store from the auto-extracted results of John Smith's mailbox. That way each data store can "stand alone", have separate permissions assigned by a clear owner, and can be faithfully recreated without dependencies on other data stores (which may no longer be accessible).

Exemplary embodiments of the present disclosure provide a method, apparatus, and computer-readable medium for assigning an identifier of an entity, and identifying/verifying an entity from multiple sources. Referring to FIGS. 1-3, shown is a simplified signaling diagram between systems suitable for use in practicing exemplary embodiments of the present disclosure. FIG. 1 depicts data sources including CRM, Email, Contact Lists, and Other Data Sources. These data sources can each contain a plurality of entities that have multiple identifiers. An entity can be a group, company, individual, organization, and the like. An identifier can be any piece of information that can be attributed to an entity that would differentiate that entity from another entity. Some exemplary identifiers include name (including shortened names), employer identification number, legal entity identifier, ticker symbol, address, email address, passport number, IP address, vehicle registration plate number, driver's license number, credit card numbers, date of birth, birthplace, telephone number, username, login information, screen name, nickname, social security number, and handle. It is understood that each of the data sources depicted in FIG. 1 may include identifiers associated with the same entity and identifiers that are associated an entity not found in other data sources. In other words, a given entity may be found in none, some, or all of the data sources.

In FIG. 2 and FIG. 3 the data sources are now different departments within a single company rather than different programs or lists. The data sources depicted in FIG. 2 and FIG. 3 include a Marketing Department, an Accounting Department, Sales Department, and an Affiliate/Subsidiary Company. It should be appreciated that embodiments of the present disclosure are applicable with any number of data sources, and that the data sources shown in FIGS. 1-3 are simply illustrative.

As shown in FIGS. 1-2, each of the data sources are operable to communicate and transmit information to a network (e.g., through a wired or wireless connection). It should be appreciated that each of the data sources may be operable to communicate with the same network (as shown in FIG. 1 and FIG. 2). However, data sources may be operable to communicate through separate networks (shown in FIG. 3). Also shown in FIGS. 1-3 is a user with a user equipment (UE). An exemplary UE (e.g., a smartphone, cellphone, tablet, wearable, computer, etc.) includes a user interface (which may include a display), at least one processor and at least one memory storing computer program instructions. An exemplary UE is operable to communicate (e.g., transmit and receive information or data) with any of the networks shown in FIGS. 1-3 and thus any of the data sources. Each of the data sources may include one or more processors, one or more memories storing computer program instructions, and are operable to communicate with a network, another data source, and/or the UE. Data sources may also include a server operable to communicate with a network. Embodiments of a network include an open network that can be accessed by anyone and a closed network that has restricted access to only authorized users. Embodiments of a network may include one or more servers.

An exemplary process begins with providing or accessing a plurality of identifiers (e.g., name, address, telephone number, email address, social security number, or username) corresponding to a plurality of entities (e.g., person, company, or group) from a plurality of data sources (e.g., manual input into a system, access to a CRM, social network, email account, or contact list). An exemplary identifier is any information that may identify a particular entity from another particular entity. The plurality of identifiers can be provided/accessed through the plurality of data sources. The process continues by creating a plurality of tuples based on the plurality of identifiers. Each one of the plurality of tuples corresponds to at least two of the identifiers that have been linked together for a particular one of the plurality of data sources. In one embodiment, each one of the plurality of tuples are hashed. The process continues with receiving an identifier (e.g., name, email address, telephone number, address, username), and determining whether the received identifier matches any of the plurality of tuples. The process then ends with displaying the matches plurality of tuples. This is illustrated in FIG. 6, which depicts multiple tuples 602, 604, 606 wherein for each tuple an email address is associated with an individual's name. Due to the connection between the different tuples 602, 604, 606, the application may or may not correctly determine that the email address is associated with the individual Christina Mack. In this example, the user has the ability to unlink a particular tuple using buttons 608 in order to correct whether this association is accurate. Thus, a user is able to enter an identifier of an entity and then receive other identifiers from multiple data sources that are also associated with the same entity.

An exemplary tuple can be created because two or more identifiers are related to one another in a given data source. For example, a tuple with an address and a telephone number for a given entity can be created because an email contains the address and telephone number for that entity. In another instance, a tuple with a username and an email address for a given entity can be created because they appear together on social user's profile page.

In some embodiments, the number of tuples that are displayed is capped to a threshold number of tuples. In another embodiment, the tuples that are used to link entities are limited by the likelihood that the identifier submitted by the user is in fact related to the tuples that are displayed or returned. For instance, embodiments include that the determining also includes assigning a percentage or number to the likelihood that the determined tuples reference the same entity as that of the identifier submitted. In this instance, determined tuples that are below a certain percentage likelihood are not used to link entities. Embodiments provide that the determining includes calculating a probability that tuples associated with an entity reference the same entity as a received identifier. Embodiments further include limiting the number of data sources that a UE can access tuples from based on whether the user of the UE is allowed to have access to those data sources.

Embodiments further provide that a user of a UE can link or unlink a particular identifier to a particular entity. For instance, a UE may input an identifier and then receive a plurality of tuples that are associated with an entity. Each of the tuples may include a probabilistic number that represents the likelihood that the tuple is associated with the same entity of the identifier. The tuples may also include a reason or likelihood or probabilistic number that the tuple is not associated with the same entity as the identifier. The user may also receive the information that was considered in the determining. In each instance, a user of a UE will be able to indicate whether a particular identifier is correctly determined to be associated with the same entity.

FIG. 4 presents a summary of the above teachings for identifying. Block 402 presents (a) providing, by a processor, a plurality of identifiers from a plurality of data sources, the plurality of identifiers corresponding to a plurality of entities; (b) creating, by the processor, a plurality of tuples based on the plurality of identifiers, wherein each one of the plurality of tuples corresponds to (i) a particular one of the plurality of data sources and (ii) to at least two identifiers that are linked together; (c) receiving, by the processor, an identifier; and (d) determining, by the processor, whether the received identifier matches any of the plurality of tuples.

Block 404 then relates to wherein the plurality of identifiers comprises names, addresses, telephone numbers, email addresses, and usernames.

Some of the non-limiting implementations detailed above are also summarized at FIG. 4 following block 404. Block 406 indicates wherein the plurality of entities comprises people, companies, and groups. Then block 408 states wherein the plurality of data sources comprises CRM, email accounts, and contact lists. Block 410 specifies wherein multiple tuples correspond to a same entity.

The logic diagram of FIG. 4 may be considered to illustrate the operation of a method, a result of execution of computer program instructions stored in a computer-readable medium. The logic diagram of FIG. 4 may also be considered a specific manner in which components of the device are configured to cause that device to operate, whether such a device is a mobile phone, cell phone, smart phone, laptop, tablet, desktop, PC or other electronic device, or one or more components thereof. The various blocks shown in FIG. 4 may also be considered as a plurality of coupled logic circuit elements constructed to carry out the associated function(s), or specific result of strings of computer program instructions or code stored in memory.

Various embodiments of the computer-readable medium include any data storage technology type which is suitable to the local technical environment, including but not limited to semiconductor based memory devices, magnetic memory devices and systems, optical memory devices and systems, fixed memory, removable memory, disc memory, flash memory, dynamic random-access memory (DRAM), static random-access memory (SRAM), electronically erasable programmable read-only memory (EEPROM) and the like. Various embodiments of the processor include but are not limited to general purpose computers, special purpose computers, microprocessors, digital signal processors, and multi-core processors.

This disclosure has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A method for identifying, the method comprising:
   (a) providing, by a processor, a plurality of identifiers from a plurality of data sources, the plurality of identifiers corresponding to a plurality of entities;
   (b) creating, by the processor, a plurality of tuples based on the plurality of identifiers, wherein each one of the plurality of tuples represents one of the plurality of entities and corresponds to (i) a particular one of the plurality of data sources and (ii) to at least two identifiers that are linked together;
   (c) receiving, by the processor, an identifier;
   (d) determining, by the processor, (i) whether the received identifier matches any of the identifiers of the created plurality of tuples, (ii) whether the received identifier is associated with one of the plurality of entities, (iii) whether a subset of the plurality of tuples represents a same one of the plurality of entities as the received identifier, and (iv) whether the received identifier is valid;
   (e) based on the received identifier being determined as valid, selectively linking or unlinking the received identifier to the determined tuples and the received identifier's association with the one of the plurality of entities; and
   (f) displaying, by the processor, the subset of the plurality of tuples that represent the same one of the plurality of entities as the received identifier.

2. The method according to claim 1, wherein the plurality of identifiers comprises names, addresses, telephone numbers, email addresses, and usernames.

3. The method according to claim 1, wherein the plurality of entities comprises people, companies, and groups.

4. The method according to claim 1, wherein the plurality of data sources comprises CRM, email accounts, and contact lists.

5. The method according to claim 1, wherein multiple tuples correspond to a same entity.

6. An apparatus comprising at least one processor and a memory storing computer program instructions executable by the at least one processor, wherein the memory with the computer program instructions and the processor are configured to cause the apparatus to at least:
   (a) provide a plurality of identifiers from a plurality of data sources, the plurality of identifiers corresponding to a plurality of entities;
   (b) create a plurality of tuples based on the plurality of identifiers, wherein each one of the plurality of tuples represents one of the plurality of entities and corresponds (i) a particular one of the plurality of data sources and (ii) to at least two identifiers that are linked together;
   (c) receive an identifier;
   (d) determine (i) whether the received identifier matches any of the identifiers of the created plurality of tuples, (ii) whether the received identifier is associated with one of the plurality of entities, (iii) whether a subset of the plurality of tuples represents a same one of the plurality of entities as the received identifier, and (iv) whether the received identifier is valid;
   (e) based on the received identifier being determined as valid, link the received identifier to the determined tuples and the received identifier's association with the one of the plurality of entities;
   (f) provide an option to unlink the linked identifier; and
   (g) display the subset of the plurality of tuples that represent the same one of the plurality of entities as the received identifier.

7. The apparatus according to claim 6, wherein the plurality of identifiers comprises names, addresses, telephone numbers, email addresses, and usernames.

8. The apparatus according to claim 6, wherein the plurality of entities comprises people, companies, and groups.

9. The apparatus according to claim 6, wherein the plurality of data sources comprises CRM, email accounts, and contact lists.

10. The apparatus according to claim 6, wherein multiple tuples correspond to a same entity.

11. A non-transitory computer-readable medium tangibly storing computer program instructions which when executed by a processor, case the processor to at least:
    (a) provide a plurality of identifiers from a plurality of data sources, the plurality of identifiers corresponding to a plurality of entities;
    (b) create a plurality of tuples based on the plurality of identifiers, wherein each one of the plurality of tuples represents one of the plurality of entities and corresponds (i) a particular one of the plurality of data sources and (ii) to at least two identifiers that are linked together;

(c) receive an identifier;

(d) determine (i) a percentage representing a likelihood that the received identifier matches any of the identifiers of the created plurality of tuples, (ii) whether the received identifier is associated with one of the plurality of entities, (iii) whether a subset of the plurality of tuples represents a same one of the plurality of entities as the received identifier, and (iv) whether the received identifier is valid; and (e) display the subset of the plurality of tuples that are determined to have a percentage likelihood to be the same one of the plurality of entities as the received identifier above a predetermined threshold.

12. The non-transitory computer-readable medium according to claim 11, wherein the plurality of identifiers comprises names, addresses, telephone numbers, email addresses, and usernames.

13. The non-transitory computer-readable medium according to claim 11, wherein the plurality of entities comprises people, companies, and groups.

14. The non-transitory computer-readable medium according to claim 11, wherein the plurality of data sources comprises CRM, email accounts, and contact lists.

15. The non-transitory computer-readable medium according to claim 11, wherein multiple tuples correspond to a same entity.

* * * * *